United States Patent [19]

Creighton, Jr. et al.

[11] 4,235,138

[45] Nov. 25, 1980

[54] PUNCH AND STRIPPER ASSEMBLY FOR A RECIPROCATING METAL-PUNCHING PRESS

[75] Inventors: Albert M. Creighton, Jr., Manchester; Charles L. Foss, Jr., Essex; Neal R. Vandewalle, Topsfield, all of Mass.

[73] Assignee: Illinois Tool Works Inc., Chicago, Ill.

[21] Appl. No.: 916,375

[22] Filed: Jun. 16, 1978

[51] Int. Cl.³ .......................... B29C 5/00; B29C 17/08; B26D 7/00
[52] U.S. Cl. ..................................... 83/139; 76/101 B; 76/107 R; 76/DIG. 7; 264/155; 264/242; 264/262
[58] Field of Search ............... 264/219, 220, 225, 242, 264/338, 334, 275, 277, 279, 261, 318, 262, 138, 155; 83/690, 685, 139, 140, 145, 142, 686, 687, 128; 76/DIG. 7, 107 R, 101 B; 29/465; 30/128, 130, 358, 368

[56] References Cited

U.S. PATENT DOCUMENTS

| | | | |
|---|---|---|---|
| 2,337,036 | 12/1943 | Erdle | 249/142 |
| 2,568,152 | 9/1951 | Hermann | 83/690 |
| 2,807,323 | 9/1957 | Taylor | 83/139 |
| 2,979,790 | 4/1961 | Lubalin | 249/142 |
| 3,015,847 | 1/1962 | Holden et al. | 249/142 |
| 3,051,607 | 8/1962 | Werth | 264/242 |
| 3,063,112 | 11/1962 | Owen | 249/142 |
| 3,110,141 | 11/1963 | Dalgleis | 83/686 |
| 3,127,457 | 3/1964 | Di Pinto | 264/338 |
| 3,228,262 | 1/1966 | Bennett | 29/465 |
| 3,228,275 | 1/1966 | Taber | 76/107 R |
| 3,234,835 | 2/1966 | Archbold et al. | 83/139 |
| 3,496,818 | 2/1970 | Porter et al. | 76/107 R |
| 3,540,314 | 11/1970 | Howard | 76/107 R |
| 3,763,542 | 10/1973 | Gutnajer | 76/107 R |
| 3,823,630 | 7/1974 | Suominen et al. | 83/685 |
| 4,048,890 | 9/1977 | Aeschbach | 83/690 |
| 4,087,912 | 5/1978 | Granone | 30/366 |
| 4,103,413 | 8/1978 | Malmberg | 83/139 |
| 4,107,842 | 8/1978 | Mackeigan | 83/139 |

FOREIGN PATENT DOCUMENTS

3157 of 1899 United Kingdom ..................... 249/142

OTHER PUBLICATIONS

Salmon, "Materials and Structures," Longman, Green & Co., N. Y., (1931), pp. 451-453.

*Primary Examiner*—W. E. Hoag
*Attorney, Agent, or Firm*—Thomas W. Buckman; Richard K. Thomson

[57] ABSTRACT

A method for making a punch and stripper assembly for a reciprocating metal-punching press in which the stripper is integrally molded about the punch while in the punch holder through the use of a certain plastics material mold cooperating with the punch holder, and a substantially liquid plastics material that can be poured in the mold and will set to a solid condition integral with the punch.

2 Claims, 6 Drawing Figures

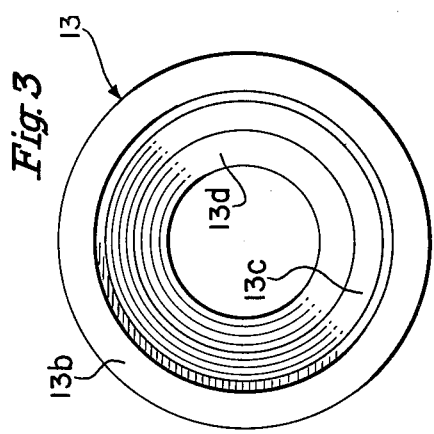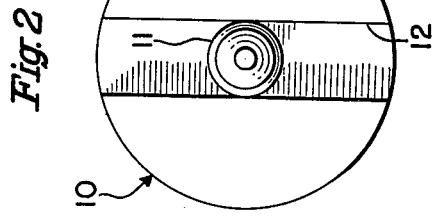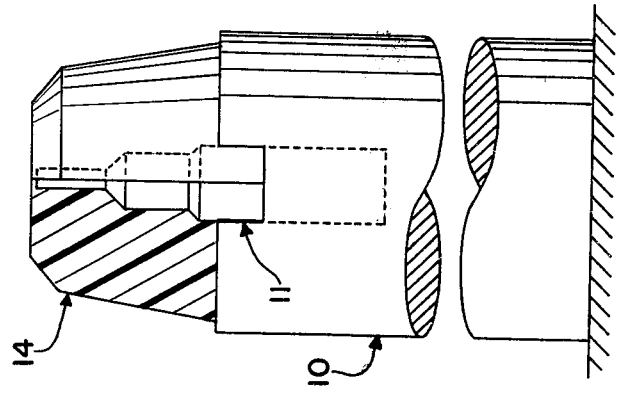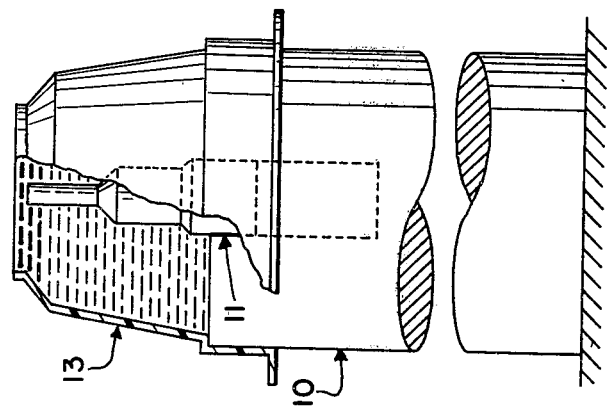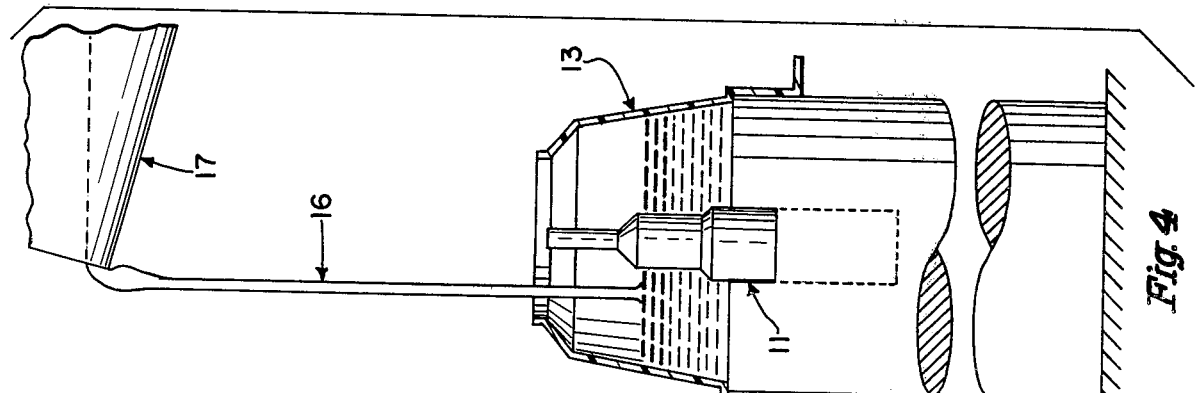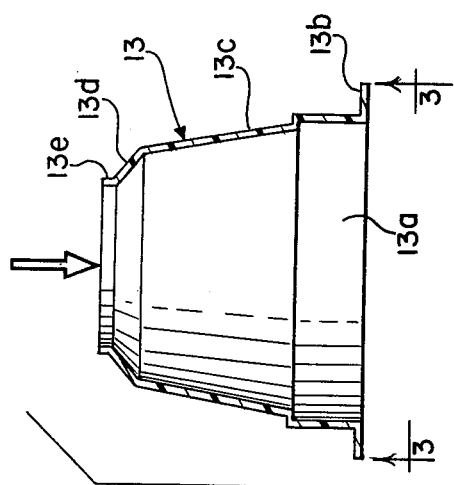

PUNCH AND STRIPPER ASSEMBLY FOR A RECIPROCATING METAL-PUNCHING PRESS

BACKGROUND OF THE INVENTION

It is known in the art of reciprocating metal-punching presses to provide precast strippers for the punches of a press. Generally, the precast stripper is shaped as a hollow cup having an opening in the bottom wall for passage of the punch therethrough. Such strippers are mounted concentrically about a punch, and are often loose fitting, providing uneven stripping pressures, and generally wear rapidly.

SUMMARY OF THE INVENTION

As opposed to the prior art stripper constructions, the present invention provides a method for making a punch and stripper assembly in which the stripper is molded integrally about the punch. The integrally molded stripper closely conforming to the shape of the punch provides an assembly in which firm even compression of the stripper occurs upon the punching action of the reciprocating metal-punching press.

In the method, a thin walled hollow plastic mold is pulled over the end of the punch holder carrying the punch. With the punch holder in an upright position, the mold is filled with a substantially noncompressible, deformable, elastic plastics material that can initially be poured substantially as a liquid from a container and that will after a period of time set into a solid condition. After the molded stripper has set, the mold is pulled from the punch holder leaving the punch holder and punch ready for use in a reciprocating metal-punching press with the stripper integrally molded about the punch.

BRIEF DESCRIPTION OF THE DRAWINGS

FIG. 1 is a side-elevational view of a punch holder and punch with the stripper mold in cross section positioned thereabove;

FIG. 2 is a top plan view of the punch and punch holder shown in FIG. 1;

FIG. 3 is a plan view of the stripper mold shown in FIG. 1 and viewed from the line 3—3 of FIG. 1;

FIG. 4 is a view similar to FIG. 1 showing the stripper mold applied and showing the stripper being cast;

FIG. 5 is a view similar to FIG. 4 showing the stripper material setting in the mold; and FIG. 6 is a side-elevational view of the punch holder, punch, and stripper assembly in the completed condition.

DETAILED DESCRIPTION OF THE PREFERRED EMBODIMENTS

The punch holder 10 is commonly a cylindrical steel member with means (not shown) for releasably retaining a punch 11 therein. The punch 11 is formed to have a tip portion of a predetermined configuration for punching holes of a desired configuration in a stock material. Some punch holders used with certain types of metal punching presses have a slot 12 formed in the end of the punch holder 10 carrying the punch 11.

In the method of the invention for providing an integral punch and stripper assembly, a mold 13 is provided. The mold 13 is preferably formed from a relatively thin plastics material. The mold 13 is shaped generally as an inverted cup open at both end. The lower end of the mold 13 is provided with a cylindrical section 13a having an internal diameter substantially equal to the outer diameter of the end of the punch holder 10 which carries the punch 11. The mold 13 is further provided with a radially outwardly extending flange 13b at the lower end of the cylindrical section 13a to enable the mold to be applied to and removed from the upper end of the punch holder 10. Immediately above the cylindrical section 13a, the mold 13 is provided with a second section 13c. The section 13c is substantially frusto-conical in shape tapering upwardly and inwardly. In a preferred embodiment, the angle of taper of the wall of the section 13c is approximately 10° from the vertical. The lower end of the second section 13c has an internal diameter slightly less than the outer diameter of the end of the punch holder 10 carrying the punch 11 so that the lower end of the section 13c is connected to the upper end of the cylindrical section 13a by a radially extending shoulder.

Immediately above the second section 13c, the mold 13 is provided with a third section 13d. The section 13d is shaped as a shallow or short frusto-conical section tapering upwardly and inwardly from the upper end of the second section 13c. In a preferred embodiment, the taper angle of the wall of the section 13d is substantially 50° from the vertical.

In a preferred embodiment, the upper end of the section 13d terminates in a short cylindrical section 13e which enables one to fill the mold 13 to a uniform level circumferentially about the mold aperture.

The mold aperture within the section 13e is substantially greater in diameter than the punch 11 so that the formed stripper 14 shown in FIG. 6 has a substantial base area for substantial pressure engagement with the metal stock material into which the punch 11 has been projected by a metal-punching press.

Further, the mold 13 is formed so that the total height of the sections 13c and 13d substantially equal the projecting height of the punch 11 from the upper surface of the punch holder 10.

In selecting a particular plastics material for the mold 13 it is preferred that a material be selected that will not bond to the stripper forming material so that the mold 13 need not be coated with a release agent for the stripper forming material.

In the method of the invention, the punch holder 10 is placed upon a solid surface 15 as shown in FIG. 1 with the punch 11 aligned vertically and extending upwardly. The mold 13 is applied over the upper end of the punch holder 10 and about the punch 11 by manually grasping the flange 13b on opposed sides thereof and pulling the cylindrical section 13a of the mold 13 telescopically down and about the upper end of the punch holder 10 until the radial shoulder between the sections 13a and 13c engages the upper surface of the punch holder 10 substantially as may be seen in FIG. 4.

The next step in the method is to provide a plastics material 16 in a substantially liquid state in a container 17 from which the material 16 can be poured into the mold 13 as shown in FIG. 4. Preferably the material 16 is a urethane compound such as the compound "Flexane" ® distributed by the Devcon Corporation of Danvers, Massachusetts. Such a compound is easily poured into the mold 13 and will within a reasonable period of time set or cure into a solid state. A urethane material 16 makes a good stripper in the solid state because it is substantially non-compressible, but is deformable and elastic. Thus as a metal-punching press inserts the punch 11 through a metal stock, the stripper 14 will bulge radially outwardly. Reductions to practice of the invention have established that a stripper 14 with a shape such as shown in FIG. 6 and formed by the described mold 13 will firmly hold the metal stock as the punch 11 is withdrawn from the metal stock. One such reduction to practice has also established the relatively long life of such a formed stripper 14, as 25,000 holes were made and the stripper 14 maintained its shape.

As shown in FIGS. 5 and 6, the method further involves maintaining the punch holder 10 in the upright position, after the mold 13 has been filled with the material 16 to the section 13e, until the material 16 cures into the solid stripper 14 of FIG. 6. As shown in FIG. 6, the mold 13 is pulled from the stripper 14 after curing leaving the punch and stripper assembly ready for use.

In order to remove the punch and stripper assembly from the punch holder 10, the upper surface of the punch holder 10 can be coated with a release agent for the material 16. Use of the release agent on the punch 11 is avoided to enable the stripper 14 to firmly and securely grip the punch 11.

Having described the invention, it is to be understood that changes can be made in the described embodiment by a person skilled in the art within the spirit and scope of the claims.

We claim:

1. An integral punch and stripper assembly for a reciprocating metal-punching press in which the punch is an elongated member of predetermined length and maximum transverse dimension having a predetermined cross-sectional shape at the outer extremity, the punch extending outwardly said predetermined length from a punch holder having a substantially planar base of substantially greater area than the cross-sectional area of the punch, the stripper being formed by a process of:

providing a plastics material initially in a substantially liquid form capable of being poured from a container and capable of setting after a period of time into a substantially non-compressible, deformable, elastic solid shape;

providing a stripper mold of a material which will not firmly bond to said plastics material and shaped generally in the form of a frusto-conical hollow mold of an axial length greater than the extending length of said punch and with the lower end being open and of an internal diameter substantially equal to the outer diameter of said one end of said punch holder base and with the upper end having an aperture substantially greater in diameter than the maximum diameter of said punch;

placing said stripper mold onto said punch holder with said lower end of said mold encircling said one end of said punch holder and with said punch within said mold;

placing said punch holder in an upright position with said aperture of said mold at the upper end thereof;

thereafter pouring said plastics material through said aperture of said mold into said mold and about said punch until said plastics material fills said mold substantially to said aperture;

thus creating a totally conforming surrounding relationship between the punch and plastic stripper forming material and a slight axial spacing between the longitudinally outermost extremity of the plastic stripper material and the longitudinally outermost extremity of the punch;

thereafter maintaining said punch holder in said upright position until said plastics material has set into said solid shape;

and thereafter pulling said mold upwardly and from engagement with said plastics material creating a closely conforming stripper member completely surrounding the punch, the stripper member defining first peripheral outer sidewall section tapering upwardly and outwardly from its free extremity at a first predetermined angle from the central axis for a first predetermined axial distance, a second peripheral outer sidewall section tapering upwardly and outwardly from the first sidewall section toward the punch holder at a second predetermined angle of taper and for a second predetermined distance, the first predetermined angle of taper being substantially greater than the second predetermined angle of taper and the first predetermined axial distance being substantially less than the second predetermined axial distance so that sufficient lateral and axial bulging of the stripper may occur at the outermost extremity of the stripper providing sufficient resiliency and rebound affect while allowing the stripper to move freely in a turret cavity.

2. The punch and stripper assembly of claim 1 wherein the plastic material forming the stripper is urethane and the first predetermined taper being approximately 50° and the second predetermined taper being approximately 10°.

* * * * *